United States Patent [19]
Shepherd

[11] 3,777,167
[45] Dec. 4, 1973

[54] DETECTING SYSTEMS

[75] Inventor: Richard Shepherd, Middlesborough, England

[73] Assignee: Decca Limited, London, England

[22] Filed: Nov. 29, 1971

[21] Appl. No.: 202,992

[30] Foreign Application Priority Data
Nov. 30, 1970 Great Britain.................. 56,678/70

[52] U.S. Cl..... 250/219 WD, 250/219 LG, 250/220
[51] Int. Cl............................................. H01j 39/12
[58] Field of Search.................... 250/221, 222, 223, 250/219 LG, 219 WD, 83.3 D, 202, 220, 235, 236, 237; 356/157, 158

[56] References Cited
UNITED STATES PATENTS

| | | | |
|---|---|---|---|
| 3,665,202 | 5/1972 | McLeman | 250/219 LG |
| 3,610,935 | 10/1971 | Von Voros | 250/202 |
| 3,418,478 | 12/1968 | Falbel | 250/202 |
| 2,791,931 | 5/1957 | Summerhayes | 250/219 WD |
| 3,286,142 | 11/1966 | Redman | 250/202 |
| 3,609,373 | 9/1971 | Desai | 250/202 |
| 3,193,681 | 7/1965 | Schwarz | 250/219 LG |

Primary Examiner—James W. Lawrence
Assistant Examiner—D. C. Nelms
Attorney—John A. Mawhinney et al.

[57] ABSTRACT

A detecting system for detecting the ends of hot steel billets. At least two and preferably three photoelectric detectors have adjacent fields of view. An electric circuit is arranged to signal when the output of one detector, the middle of the three, exceeds half the output of either of the other detectors. Other logical functions are provided to sense the beginning and end of a billet reliably.

6 Claims, 3 Drawing Figures

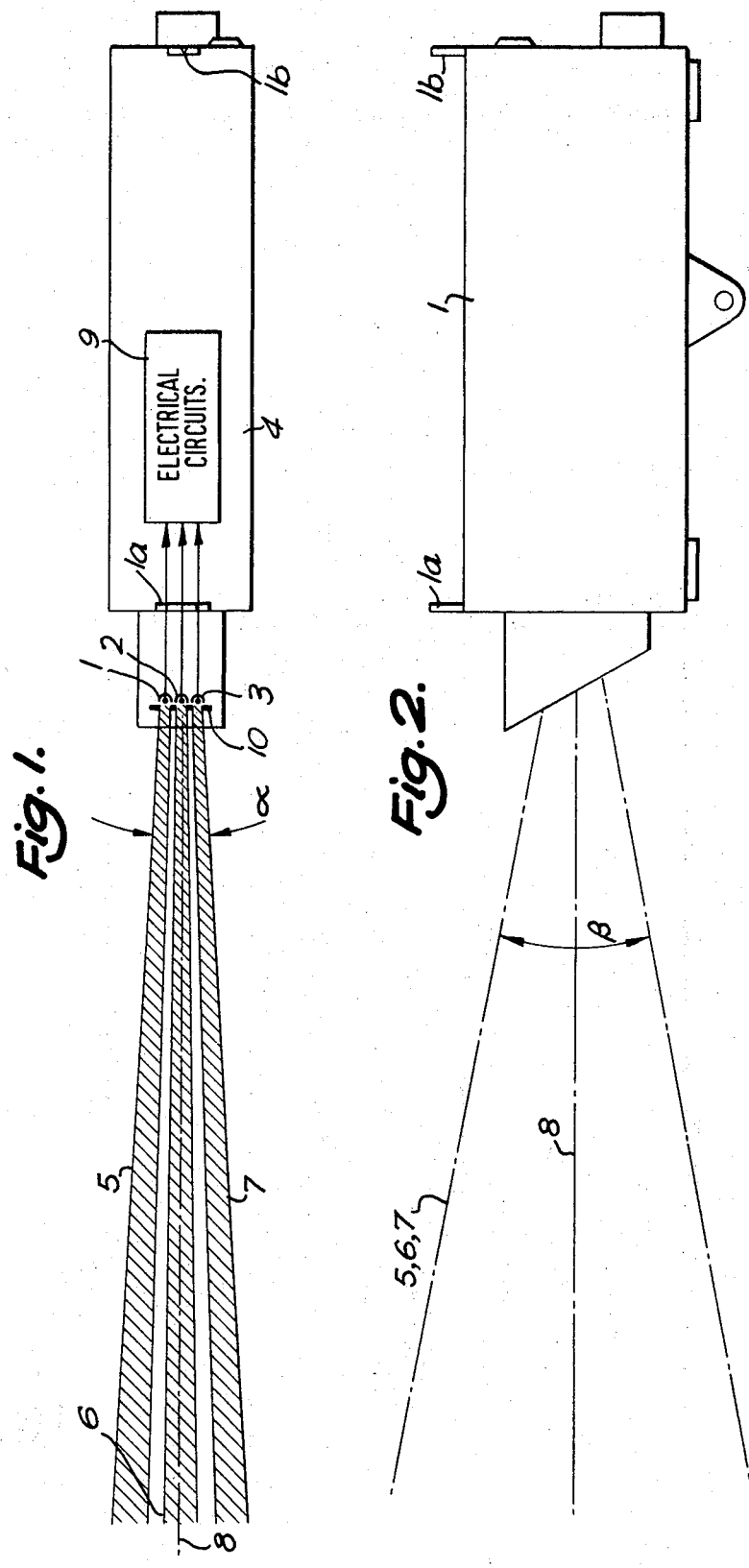

DETECTING SYSTEMS

FIELD OF THE INVENTION

This invention relates to detecting systems and particularly to detectors for detecting the ends of pieces of hot rolled steel.

BACKGROUND OF THE INVENTION

It is known to detect the position of an end of a piece of hot metal (called hereinafter 'billet') by means of a photoelectric detector. It will be appreciated that it is often important to provide a precise indication of the instant at which the end of the billet passed a given point. At present most detectors have an angle of view which must be partially filled in order to trigger the detector. Because it is the total energy received by the detector which causes it to trigger the position of the end of billet causing triggering can alter widely as the temperature or size of the metal varies.

It is desirable, in order to achieve accurate detection, that the detector should have a narrow angle of view in a triggering plane, i.e., as far as the direction of movement of the billet is concerned.

It is also desirable that any detector used in the circumstances mentioned should have a wide wedge of view transverse the triggering plane, so that the position of the billet need not be closely constrained in the latter plane. The main object of the invention is the achieving of a narrow angle of view in the triggering plane while making possible a wide angle of view in the transverse plane.

SUMMARY OF THE INVENTION

According to the invention a detecting system comprises first, second and third photoelectric detectors having respective adjacent, laterally spaced fields of view the field of view of the second detector being between the fields of view of the first and third detectors, and an electrical circuit arranged to signal when the output of the second detector exceeds a predetermined fraction, preferably half of the output of one or other of the first and third detectors. With this arrangement, the detecting plane is fixed regardless of the total energy of the billet. With three detectors as described above the intersection of the detecting plane can be sensed reliably regardless of the direction in which a billet approaches that plane.

In a preferred embodiment of the invention a logical circuit is arranged to develop and store a signal commencing when one end of a billet intersects the said plane and ending when the other end of the billet intersects the plane.

BRIEF DESCRIPTION OF THE DRAWINGS

FIG. 1 is a plan view of an optical system;
FIG. 2 is an elevation of the system of FIG. 1.

DESCRIPTION OF THE PREFERRED EMBODIMENT

Figure 3:
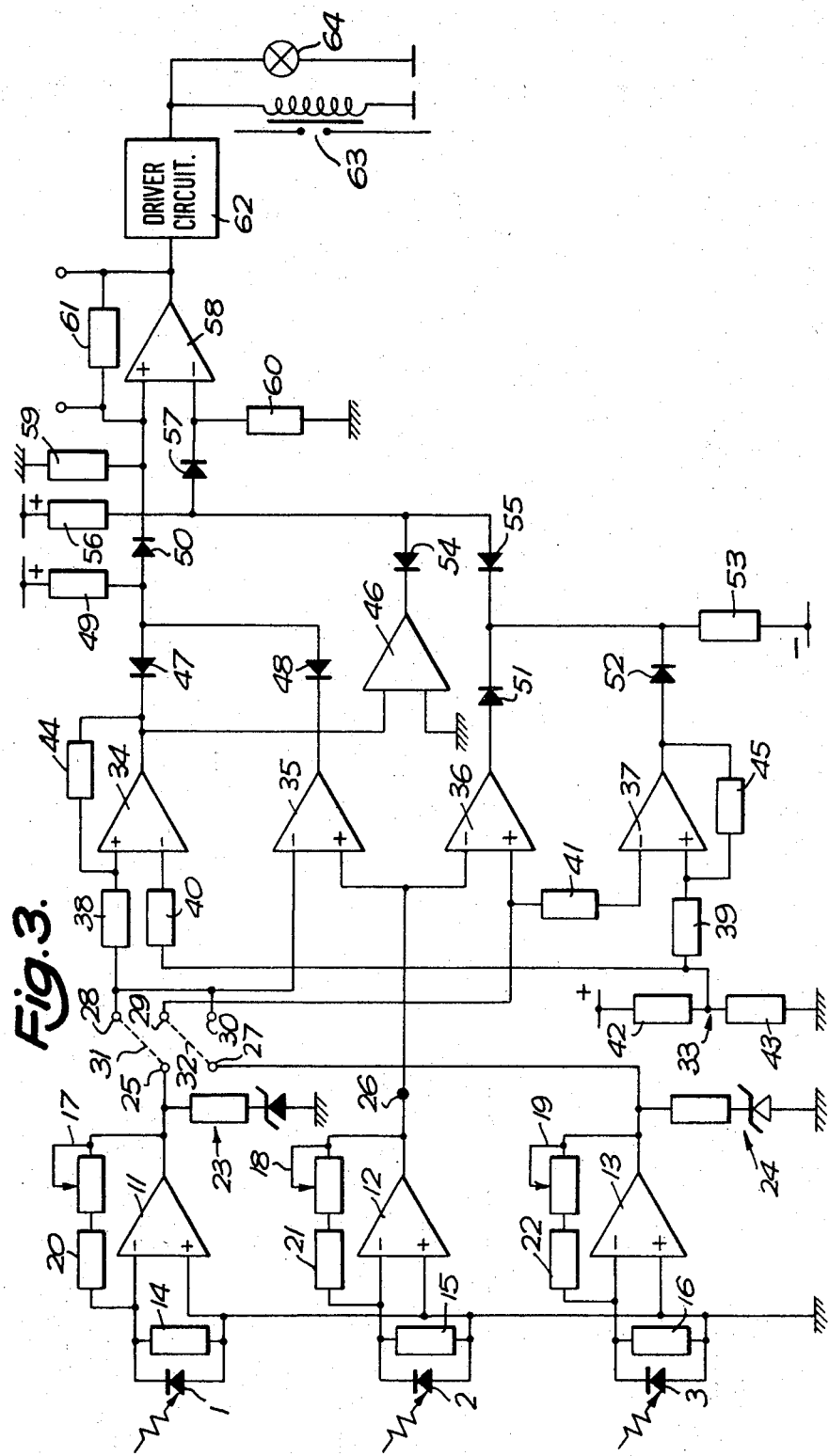
FIG. 3 is a schematic diagram of an electrical circuit.

FIG. 1 illustrates diagrammatically a housing 4 containing three photoelectric detectors 1, 2 and 3 which have respective, divergent, fields of view 5, 6 and 7 that, in plan, are adjacent and laterally spaced apart. The fields of view may converge to a common focus. They can readily be produced by suitable optical masks 10 and lenses. The central field 6, preferably about 2° wide, straddles the optical axis 8 that projected vertically denotes the principal plane of detection. As described hereafter, it is intended that the detecting system should signal when the end of a hot billet just intersects the plane of detection.

The fields 5 and 7, preferably about two degrees wide are disposed one on each side of the field 6. Only one of the fields 5 and 7 would be necessary if billets were to approach from one side only. The total angular extent $\alpha$ of the fields of view is preferably 8° in azimuth. The fields could overlap in azimuth. In ther vertical plane, the fields 5,6 and 7 may have approximately the same angular extent $\beta$, which may be 15°.

The detectors are coupled to electrical circuits 9 arranged to signal when, for example, the output of the detector 2 is a predetermined fraction of the output of either the detector 1 or the detector 3. Preferably the fraction is one half so that either condition denotes that the object billet just intersects a plane of detection which is the same for either direction of approach of the billet.

The housing is provided with a foresight 1a and a backsight 1b aligned along the optical axis 8 for aiming the fields of view.

FIG. 3 illustrates a preferred embodiment of the electrical circuit 9 shown in FIG. 1. This circuit is intended to respond to two fundamental sets of conditions of the detectors. If R(1) is, for example, the level of radiation detected by the detector 1 and T is a preset threshold, then a signal is produced if R(1) is greater than T and 2R(2) is greater than R(1). The former requirement is used to inhibit spurious indications. The second condition consists in R(1) being less than T and either R(3) being less than T or R(3) being greater than 2R(2). The two conditions indicate the intersections of the plane of detection by respectively, one end of a billet entering the purview of the detector and the other end as the billet leaves. The two conditions apply for one direction of movement of the billet; if this direction is reversed, R(3) must be substituted for R(2) in the above conditions and the circuit contains provision for altering the operating mode accordingly.

In the circuit shown in FIG. 3, the three photoelectric detectors 1, 2 and 3 are constituted by photo-diodes operating in a current generating mode. Each diode is connected between the inverting input and non-inverting input of a respective one of three operational amplifiers 11, 12 and 13, which are conveniently integrated circuits for which the individual power supplies are, for simplicity, omitted from the Figure. The diodes are each in parallel with one of the resistors 14, 15 and 16.

The gains of the amplifiers can be adjusted by the respective variable resistors 17, 18 and 19 which are in series with respective resistors 20, 21 and 22 in the feedback paths of the amplifiers 11, 12 and 13. Normally the gain of the amplifier 12 will be set at twice the gain of each of the amplifiers 11 and 13.

The output voltages of the amplifiers 11 and 13 are limited by the respective shunts 23 and 24 each consisting of a resistor and a Zener diode. In this way the output voltage of the amplifiers associated with the outer fields of view (5 and 7) is kept less than the output voltage of the amplifier associated with the middle field 6 if the amplifiers are saturated and the system can still continue to detect an object.

The amplifiers 11, 12 and 13 have respective output terminals 25, 26 and 27. The terminals of the succeeding logical circuit are the terminals 28, 29 and 30. If the system is used for detecting objects intercepting the field 5 first as they cross the fields of view the terminals 25 and 28 are connected by a link 31 and the terminals 27 and 29 are connected by the link 32. If the objects' movement is reversed, it is appropriate to adjust the links so that the link 31 connects the terminals 25 and 29 and the link 32 connects the terminals 27 and 30.

The terminals 26, 28, 29 and 30 and a potentiometer 33 are variously connected to four comparator amplifiers 34, 35, 36 and 37. The terminal 26 of the amplifier 12 is connected to one input of each of the comparators 35 and 36. The terminal 28 is connected to an input of the comparator 34 through an input resistor 38 and to an input of the comparator 35. The terminal 29 is connected to an input of the comparator 36 and to an input of the comparator 37 through an input resistor 41. The terminal 30 is connected to the terminal 28. The potentiometer 33, which is energised by a positive voltage, is connected to an input of the comparator 34 through a resistor 40 and to an input of the comparator 37 through a resistor 39. The potentiometer comprises resistors 42 and 43 and is adjustable; the resistor 43 is preferably mounted for easy removal and exchange for another resistor. Feedback resistors 44 and 45 provide the comparators 34 and 37 with hysteresis.

The comparators 34 to 37 are arranged to make comparisons in accord with the logical functions mentioned above. The threshold T is set by the potentiometer. When the terminals are linked as shown, the comparators 34 to 37 produce output signals denoting when, respectively, $R(1)>T$, $2R(2)>R(1)$, $2R(2)<R(3)$ and $R(3)<T$. By changing the links between the terminals in the manner already described, the functions performed by the comparators are, respectively, $R(3)>T$, $2R(2)>R(3)$, $2R(2)<R(1)$ and $R(1)<T$. An additional inverter 46 provides, in addition to the normal function of the comparator 34, the inverse of that function, namely either $R(1)<T$ or $R(3)<T$.

For convenience the remainder of the logical circuit will be described assuming the terminals are linked as shown.

Two diodes 47 and 48, connected to the outputs of the comparators 34 and 35 respectively, and a resistor 49 form a first diode AND circuit which yields the logical function $(R(1)>T) \cdot (2R(2)>R(1))$ which, if fulfilled, gives a switch-on signal to a memory circuit through a diode 50. Diodes 51 and 52 and a resistor 53 form an OR circuit which yields the logical function $(R(3)<T)+ (R(3)>2R(2))$. This circuit and the inverter 46 feed an AND circuit, comprising diodes 54 and 55 and a resistor 56, which provides the aforementioned condition which, if fulfilled gives a switch-off signal to the memory circuit through a diode 57.

The memory circuit consists of the diodes 50 and 57, a comparator amplifier 58 to whose non-inverting and inverting inputs the diodes 50 and 57 are respectively connected, the resistor 59 and 60 between respective inputs of the comparator and ground, and a feedback resistor 61 between the output of the comparator 58 and the input to which the diode 50 is connected. The memory serves to store the switch-on signal denoted by a positive signal at the non-inverting input, by providing a continuous positive output, until the switch-off signal is received, whereupon the inverting input of the comparator goes positive and the output of the memory goes negative.

The output of the memory circuit is fed to any suitable driver circuit 62 and thence to a relay 63 and an indicating lamp 64. The relay can be used for actuating measuring and counting circuits as desired.

The housing 1 is preferably portable or otherwise capable of being moved.

I claim:

1. A detecting system comprising first, second and third detectors having respective adjacent laterally spaced fields of view, the field of view of the second detector being between the fields of view of the first and third detectors, and an electrical circuit for signalling when the output of the second detector exceeds a predetermined fraction of the output of one or other of the first and third detectors, the electrical circuit comprising a first comparator for comparing the output of the second detector with the output of either one of the first and third detectors, a second comparator for comparing the output of either one of the first and third detectors with a predetermined threshold, means for inhibiting signalling unless the output of the said one or other detectors exceeds said predetermined threshold, and means for selecting the output of one of the said first and third detectors for feeding to the comparators.

2. A detecting system according to claim 1 in which the fields of view are narrower in the plane in which they are spaced than in an orthogonal plane.

3. A detecting system according to claim 1, in which the predetermined fraction is one half.

4. A detecting system according to claim 3 in which the electrical circuit is arranged to stop signalling when the output of the first or third detector, of which the output is compared with the output of the second detector, is less than a threshold; and either the output of the other one of the first and third detectors is less than a threshold, or half the output of the said other one of the first and third detectors is greater than the output of the second detector.

5. A detecting system according to claim 1 in which adjustable amplifiers are provided for amplifying the outputs of the detectors before those outputs are compared.

6. A detecting system according to claim 1 in which the detectors are disposed in a movable housing which has sights for aiming the fields of view.

* * * * *